United States Patent
Kemmer et al.

(10) Patent No.: US 12,249,742 B2
(45) Date of Patent: Mar. 11, 2025

(54) METHOD FOR OPERATING A FUEL CELL SYSTEM, AND FUEL CELL SYSTEM

(71) Applicant: Robert Bosch GmbH, Stuttgart (DE)

(72) Inventors: Helerson Kemmer, Vaihingen (DE); Pere Antoni Pastor Nigorra, Tuebingen (DE); Joerg Heyse, Besigheim (DE); Ralf Brandenburger, Erdmannhausen (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 17/763,878

(22) PCT Filed: Sep. 16, 2020

(86) PCT No.: PCT/EP2020/075816
§ 371 (c)(1),
(2) Date: Mar. 25, 2022

(87) PCT Pub. No.: WO2021/058343
PCT Pub. Date: Apr. 1, 2021

(65) Prior Publication Data
US 2022/0352531 A1    Nov. 3, 2022

(30) Foreign Application Priority Data
Sep. 26, 2019 (DE) .......... 10 2019 214 711.9

(51) Int. Cl.
*H01M 8/04* (2016.01)
*H01M 8/04007* (2016.01)
(Continued)

(52) U.S. Cl.
CPC ... *H01M 8/04171* (2013.01); *H01M 8/04037* (2013.01); *H01M 8/04097* (2013.01);
(Continued)

(58) Field of Classification Search
CPC ......... H01M 8/04171; H01M 8/04302; H01M 8/04303; H01M 8/04037; H01M 8/04097; H01M 8/04201
See application file for complete search history.

(56) References Cited

U.S. PATENT DOCUMENTS 6,541,141 B1 * 4/2003 Frank ................ H01M 8/04164
429/444
8,347,645 B1 * 1/2013 Miller ............... H01M 8/04231
62/238.7
(Continued)

FOREIGN PATENT DOCUMENTS

DE    102007026652 A1    12/2008
DE    102007052149 A1    5/2009
(Continued)

OTHER PUBLICATIONS

Translation of International Search Report for Application No. PCT/EP2020/075816 dated Dec. 3, 2020 (2 pages).

Primary Examiner — Olatunji A Godo
(74) Attorney, Agent, or Firm — Michael Best & Friedrich LLP

(57) ABSTRACT

The invention relates to a method for operating a fuel cell system, in particular a PEM fuel cell system, in which an anode gas is supplied to an anode (1) of a fuel cell via a supply path (2), and is fed back via a recirculation path (3) connected to the anode (1), wherein hydrogen is used as the anode gas. According to the invention, during the start up of the fuel cell system, the anode gas is supplied to a drying device (4), in particular an adsorber, via at least one normally open valve (8, 9, 10), and water is extracted from the anode gas using the drying device (4). The invention also relates to a fuel cell system, in particular a PEM fuel cell system, which is suitable for carrying out the method.

18 Claims, 4 Drawing Sheets

(51) Int. Cl.
*H01M 8/04082* (2016.01)
*H01M 8/04089* (2016.01)
*H01M 8/04119* (2016.01)
*H01M 8/04302* (2016.01)
*H01M 8/04303* (2016.01)
*H01M 8/04828* (2016.01)

(52) U.S. Cl.
CPC ... *H01M 8/04201* (2013.01); *H01M 8/04302* (2016.02); *H01M 8/04303* (2016.02); *H01M 8/04835* (2013.01)

(56) References Cited

U.S. PATENT DOCUMENTS

| | | | |
|---|---|---|---|
| 2005/0132883 A1* | 6/2005 | Su | C10K 3/04 423/220 |
| 2005/0186458 A1* | 8/2005 | Rusta-Sallehy | C25B 9/17 429/418 |
| 2007/0287037 A1 | 12/2007 | Limbeck | |
| 2009/0123787 A1* | 5/2009 | Shimoi | H01M 8/04447 429/429 |

FOREIGN PATENT DOCUMENTS

| | | |
|---|---|---|
| DE | 102011114721 A1 | 4/2013 |
| DE | 102017210339 A1 | 12/2018 |

\* cited by examiner

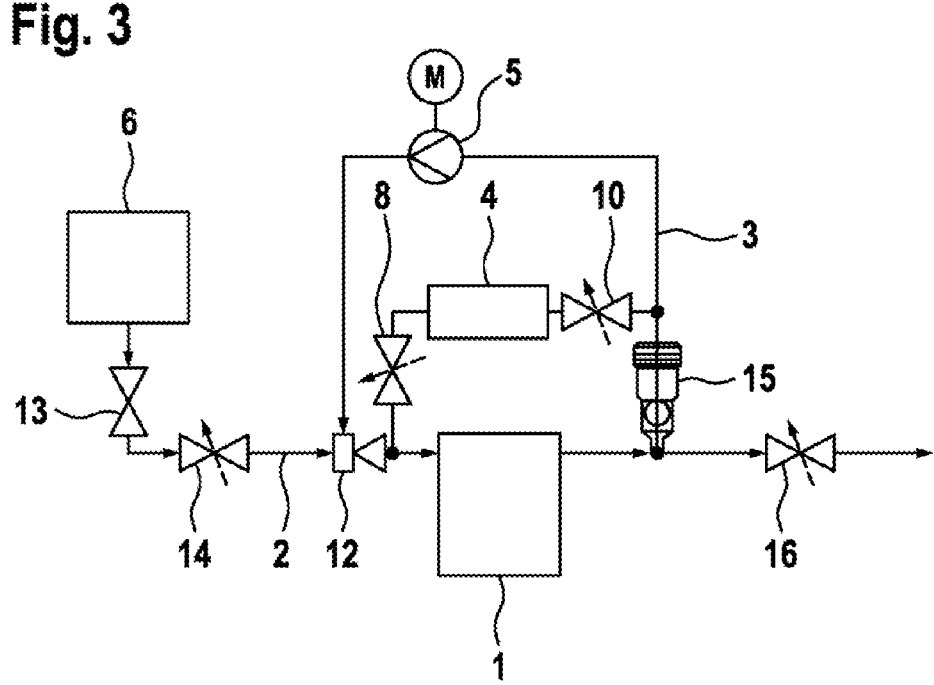
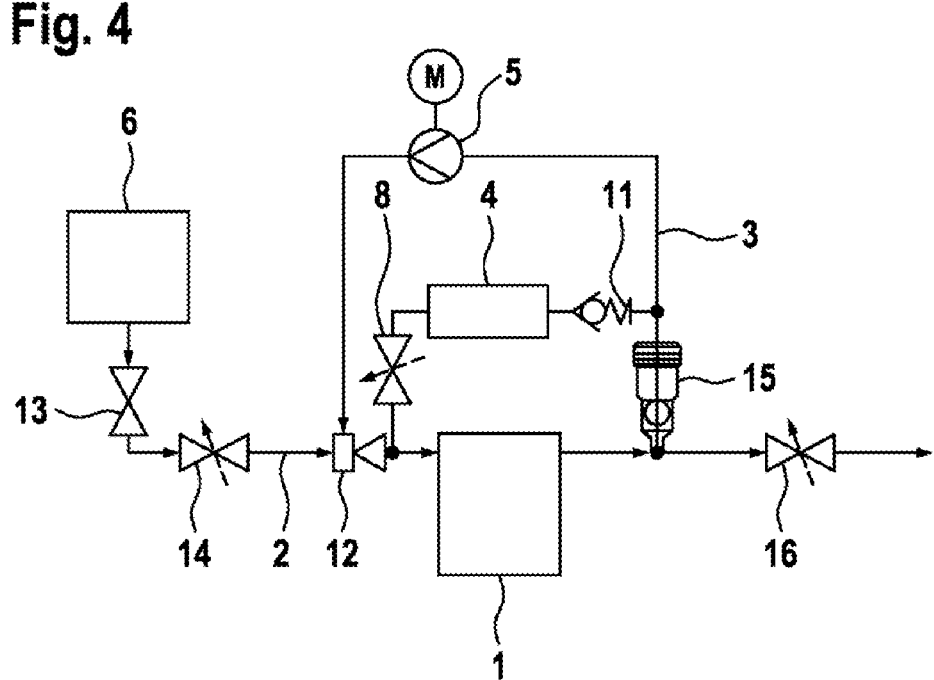

METHOD FOR OPERATING A FUEL CELL SYSTEM, AND FUEL CELL SYSTEM

BACKGROUND

The invention relates to a method for operating a fuel cell system, in particular a PEM fuel cell system. Moreover, the invention relates to a fuel cell system, in particular a PEM fuel cell system, which is suitable for carrying out the method according to the invention or can be operated by the method according to the invention.

By means of a fuel cell of a fuel cell system of the type mentioned at the outset, chemical energy is converted into electrical energy using hydrogen and oxygen. In this case, a polymer membrane can be used as the electrolyte. If this is the case, it is a PEM (proton exchange membrane) fuel cell. Fuel cell systems having such fuel cells are referred to as PEM fuel cell systems.

The electrical energy obtained by means of a fuel cell system by way of electrochemical conversion can be used as drive energy, e.g. to drive a vehicle. The hydrogen required for this purpose is carried on board the vehicle in a suitable tank. The oxygen that is also required can be extracted from the ambient air.

Hydrogen-based fuel cell systems are considered to be the mobility concept of the future since only water or water vapor is emitted. In addition, fast refueling times can be achieved. However, it proves problematic that a gaseous water component contained in the hydrogen can condense out and freeze at correspondingly low ambient temperatures. If the system is started at correspondingly low ambient temperatures, there is accordingly the risk that a hydrogen-carrying anode path of the fuel cell system will ice up.

In order to avoid this, the prior art discloses system topologies which have at least one electric heating device in the region of the anode or in the anode path. However, the operation of the at least one heating device imposes a load on the vehicle battery. Moreover, the process of deicing with the aid of the at least one heating device can take several seconds or minutes to complete, lengthening the starting time.

Proceeding from the aforementioned prior art, the object underlying the present invention is to shorten the starting times of a fuel cell system, especially at low ambient temperatures at which water contained in the anode gas freezes.

SUMMARY

In the proposed method for operating a fuel cell system, in particular a PEM fuel cell system, an anode gas is supplied to an anode of a fuel cell via a supply path, and is recirculated via a recirculation path connected to the anode. Hydrogen is used as the anode gas. According to the invention, during the starting of the fuel cell system, the anode gas is supplied to a drying device, in particular an adsorber, via at least one normally open valve, and water is removed from the anode gas using the drying device.

Removing water during starting minimizes the risk that water which condenses during starting will freeze and delay the starting process. The risk is great particularly when starting since the system has not yet warmed up at this point in time, and water vapor contained in the anode gas can easily condense. By using an adsorber as the drying device, the method can be implemented in a simple and inexpensive manner. The integration of the drying device via at least one normally open valve ensures that the drying device is immediately ready for operation when the fuel cell system is started, but can be switched off if necessary.

As a further development of the invention, it is proposed that, during the operating shutdown of the fuel cell system, the anode gas is supplied to the drying device via at least one normally open valve, and water is removed from the anode gas using the drying device. In this case, the fuel cell system is started with anode gas which has already been predried, and therefore, when the fuel cell system is started, the anode gas contains less water vapor which can condense. In this way, the starting process can be shortened further.

To promote the predrying of the anode gas, the operation of a blower arranged in the recirculation path is preferably maintained during the operating shutdown of the fuel cell system. The blower assists the recirculation or circulation of the anode gas. Since a blower is often already present in the recirculation path, this measure requires no additional technical outlay.

In normal operation of the fuel cell system, the at least one normally open valve via which the drying device is connected to the supply path and/or the recirculation path can be closed. This is because the system has then reached its normal operating temperature, and therefore there is no longer any risk that water contained in the anode gas will freeze. Furthermore, the closed valve ensures that the charging of the drying device with water does not increase further.

As the adsorption capacity of the drying device is not infinite, it is proposed that water is removed from the drying device by desorption during the operation of the fuel cell system. For this purpose, the at least one normally open valve is opened again, reestablishing the connection of the drying device to the supply path and/or the recirculation path. In this case, water is removed from the drying device by desorption and is discharged via the anode gas, which adsorbs the water. This means that the drying process is reversed.

To promote desorption during the operation of the fuel cell system, fresh and thus largely dry anode gas can be supplied to the drying device from a tank. Alternatively, it is possible to supply the drying device with recirculated anode gas which has already been warmed up and dried during operation, e.g. by frequent "purging" or flushing, which serves primarily to remove nitrogen but also carries away water vapor or water contained in the anode gas at the same time.

In addition, desorption can be promoted by heating the drying device by means of a heating device.

The fuel cell system, in particular a PEM fuel cell system, also proposed for achieving the object stated at the outset, comprises at least one fuel cell having an anode, which is connected on the inlet side to a supply path for supplying an anode gas and on the outlet side to a recirculation path for recirculating the anode gas. According to the invention, the fuel cell system is distinguished by a drying device, in particular by an adsorber, which is connected to the supply path and/or the recirculation path via at least one normally open valve.

By means of the drying device, water can be extracted from the anode gas, in particular in order to allow the fuel cell system to be started in an ice-free and thus rapid manner after an operating shutdown. Accordingly, the proposed fuel cell system is suitable, in particular, for carrying out the method according to the invention described above or can be operated by this method. With regard to the advantages of the proposed fuel cell system, reference can therefore be made to the advantages of the method according to the invention described above.

The drying device of the proposed fuel cell system can be connected exclusively to the supply path or exclusively to the recirculation path via the at least one normally open valve. Furthermore, the drying device can be connected or connectable both to the supply path and to the recirculation path via at least two valves, of which at least one valve is embodied as a normally open valve. The drying device can be connected in parallel with the anode, for example. The connection of the drying device via at least one normally open valve makes it possible to dry or predry the anode gas both during operation and during an operating shutdown of the fuel cell system. If charging of the drying device with water is to be prevented, the valve can be closed.

Alternatively, the at least one normally open valve can be selectively left open or opened in normal operation of the fuel cell system in order to remove water from the drying device by desorption. In this way, the charging of the drying device with water can be reduced to ensure that the drying device remains ready for adsorption. This is because the adsorption capacity of the drying device is not unlimited. During desorption, the drying device releases water to the anode gas, via which the water is discharged. By subsequent "purging" or flushing, the water is then—at least in some cases—completely removed from the system.

Advantageously, the at least one normally open valve can be opened to integrate the drying device into the system with different opening cross sections. In this way, it is possible to exercise open-loop or closed-loop control over the anode gas mass flow in the direction of the drying device. The at least one normally open valve can accordingly be designed as an on-off valve or as a proportional valve.

According to a preferred embodiment of the invention, the drying device is connected to the supply path via at least one normally open valve and can be connected to the recirculation path via a check valve opening in the direction of the recirculation path. In this way, a flow direction through the drying device is predetermined.

An ejector pump is preferably arranged in the supply path. By means of the ejector pump, it is possible not only to remove fresh anode gas from a tank but also to promote the recirculation of the anode gas at the same time. As an alternative or additional proposal, a blower is arranged in the recirculation path to promote the recirculation of the anode gas.

Furthermore, the drying device preferably has a heating device. When necessary, desorption can be assisted by means of the heating device, thus ensuring that the drying device releases water to the anode gas more quickly.

According to a preferred embodiment of the invention, the drying device comprises a container which is filled with zeolite and is designed to be permeable to the anode gas at least in some region or regions. For example, the container can be perforated at least in some region or regions or can be configured at least in some region or regions as a cage. Furthermore, the zeolite charge is preferably embodied as a bed. This means that the zeolite material is in the form of granules. This has the advantage that a particularly large surface area is created via which water can be adsorbed or desorbed. Furthermore, the anode gas can be passed through the container or through the zeolite material accommodated in the container.

BRIEF DESCRIPTION OF THE DRAWINGS

The invention is explained in greater detail below with reference to the attached drawings. In the drawings:

FIG. 3 shows a schematic illustration of an anode region of a third preferred embodiment of a fuel cell system according to the invention, FIG. 4 shows a schematic illustration of an anode region of a fourth preferred embodiment of a fuel cell system according to the invention.

DETAILED DESCRIPTION

Figure 1:
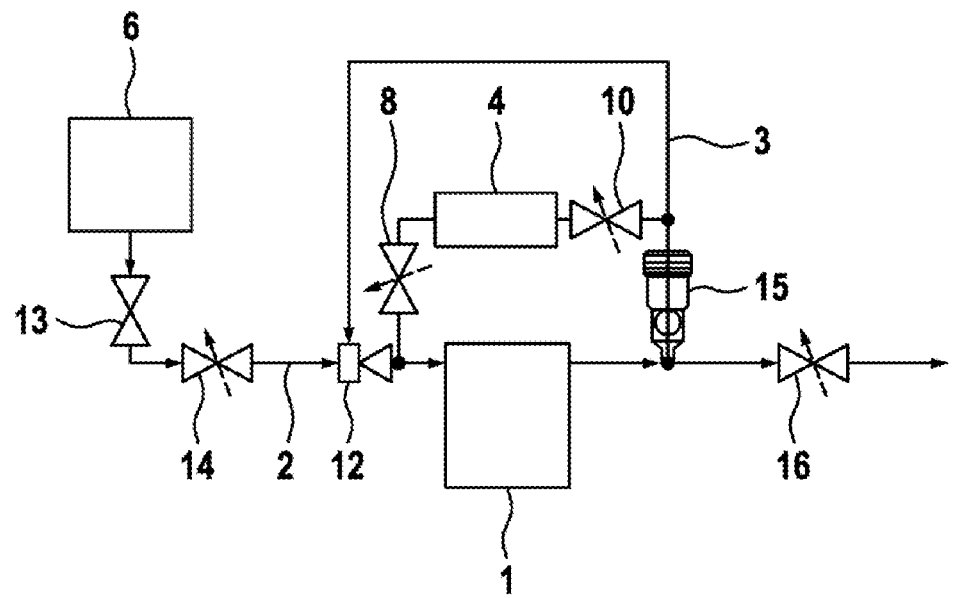
FIG. 1 shows a schematic illustration of an anode region of a first preferred embodiment of a fuel cell system according to the invention.

FIG. 1 shows the anode region of a fuel cell system according to the invention. During the operation of the fuel cell system, an anode gas, which is taken from a tank 6, is fed to an anode 1 of the fuel cell system via a supply path 2. Removal takes place by opening a metering valve 14, which is arranged in the supply path 2 and upstream of which a pressure reducer 13 is arranged in the present case. The anode gas is supplied to the anode 1 via an ejector pump 12, which is arranged in the supply path 2 and has the effect that anode gas emerging from the anode 1 is recirculated via a recirculation path 3. As illustrated here, a water separator 15 can be arranged in the recirculation path 3, which separator passes on an excess of water to a purge valve 16. When the purge valve 16 is opened, the excess water is thus discharged and removed from the system.

In order to remove water, which is produced in particular by condensation of water vapor contained in the anode gas, a fuel cell system according to the invention has a drying device 4. In the exemplary embodiment of FIG. 1, the drying device 4 is connected to the supply path 2 via a first normally open valve 8 and to the recirculation path 3 via a second normally open valve 10. The drying device 4 is thus arranged parallel to the anode 1. The drying device 4 is preferably designed as an adsorber, it being possible, in particular, for a container filled with zeolite to serve as an adsorber.

Water contained in the anode gas is adsorbed by the at least one normally open valve 8, 10 during an operating shutdown, ensuring that it does not freeze at correspondingly low ambient temperatures. During the subsequent starting of the fuel cell system, the at least one valve 8, 10 remains open, and therefore water continues to be adsorbed and icing of the system or of individual system components is prevented. In particular, water formed by condensation only during the starting phase is adsorbed. In the case of increased ambient temperatures or in normal operation of the fuel cell system, when the temperature in the system is reliably above the frost temperature, the at least one normally open valve 8, 10 is closed, with the result that there is no longer any connection from the drying device 4 to the supply path 2 and the recirculation path 3. The drying device 4 is thus no longer charged with water. In order to reduce the charging of the drying device 4 with water, the at least one normally open valve 8, 10 can be opened again, ensuring that water is discharged from the drying device 4 to the anode gas by desorption. This presupposes that largely dry anode gas is present in the supply path 2 and/or in the recirculation path 3. This is the case, for example, if it is fresh anode gas taken from the tank 6 or if it is anode gas that has been "run dry". All that is required for "running dry" is to open the purge valve 16 more frequently.

Figure 2:
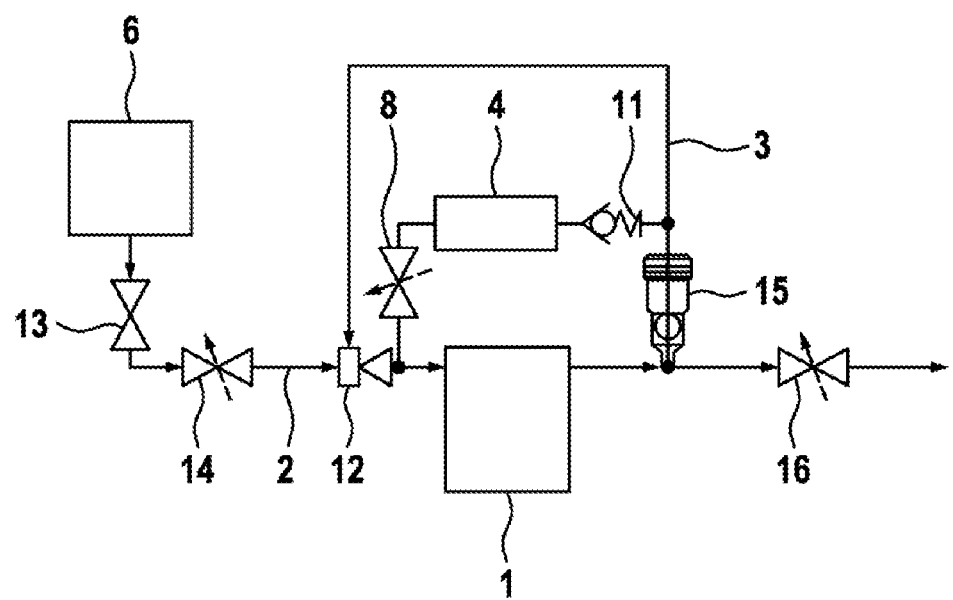
FIG. 2 shows a schematic illustration of an anode region of a second preferred embodiment of a fuel cell system according to the invention.

FIG. 2 shows a modification of the embodiment of FIG. 1. Instead of a second normally open valve 10, the drying device 4 is or can be connected to the recirculation path 3 via a check valve 11. The check valve 11 opens in the direction of the recirculation path 3, thereby predetermining the flow direction of the anode gas through the drying device 4.

A further modification of the embodiment of FIG. 1 is illustrated in FIG. 3. In this case, a blower 5, which promotes the recirculation of anode gas, is additionally arranged in the recirculation path 3.

FIG. 4 shows a corresponding modification of the embodiment of FIG. 2, that is to say the embodiment of FIG. 2 with a blower 5 in the recirculation path 3.

Figure 5:
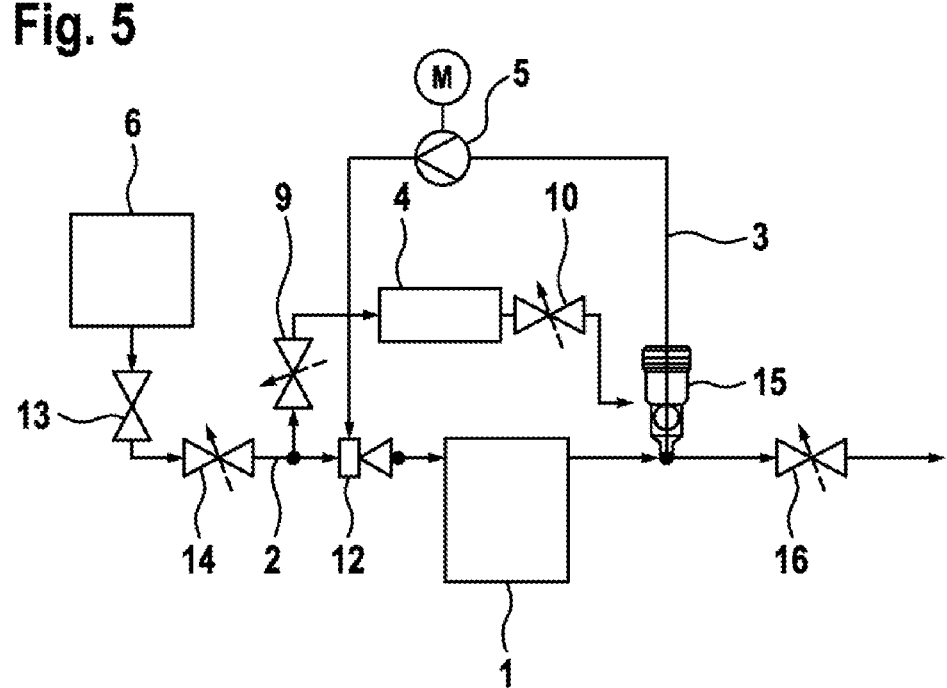
FIG. 5 shows a schematic illustration of an anode region of a fifth preferred embodiment of a fuel cell system according to the invention.

A further preferred embodiment can be seen in FIG. 5. Here, the connection of the drying device 4 to the supply path 2 is established via a normally open valve 9, which opens into the supply path 2 between the metering valve 14 and the ejector pump 12. Thus, fresh and hence largely dry anode gas can be supplied to the drying device 4 from the tank 6 via the valve 9, the desorption of the drying device 4 thus being promoted by the supply of dry hydrogen.

Figure 6:
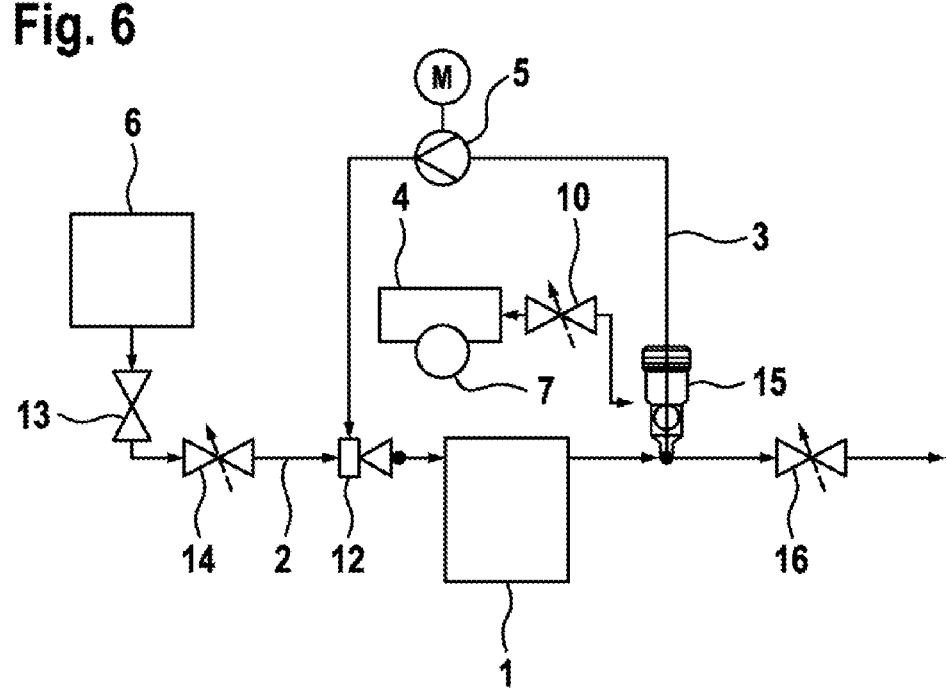
FIG. 6 shows a schematic illustration of an anode region of a sixth preferred embodiment of a fuel cell system according to the invention.

Since the fresh or dry hydrogen from the tank 6 may not be hot enough for rapid desorption, it is further proposed that—as illustrated by way of example in FIG. 6—a heating device 7 is additionally provided. The heat required for rapid desorption can thus be introduced via the heating device 7. The variant illustrated additionally has the advantage that one valve 8 or 9 is eliminated. The drying device 4 is supplied with a flow from a single valve 10 both during the adsorption phase and during the desorption phase.

Figure 7:
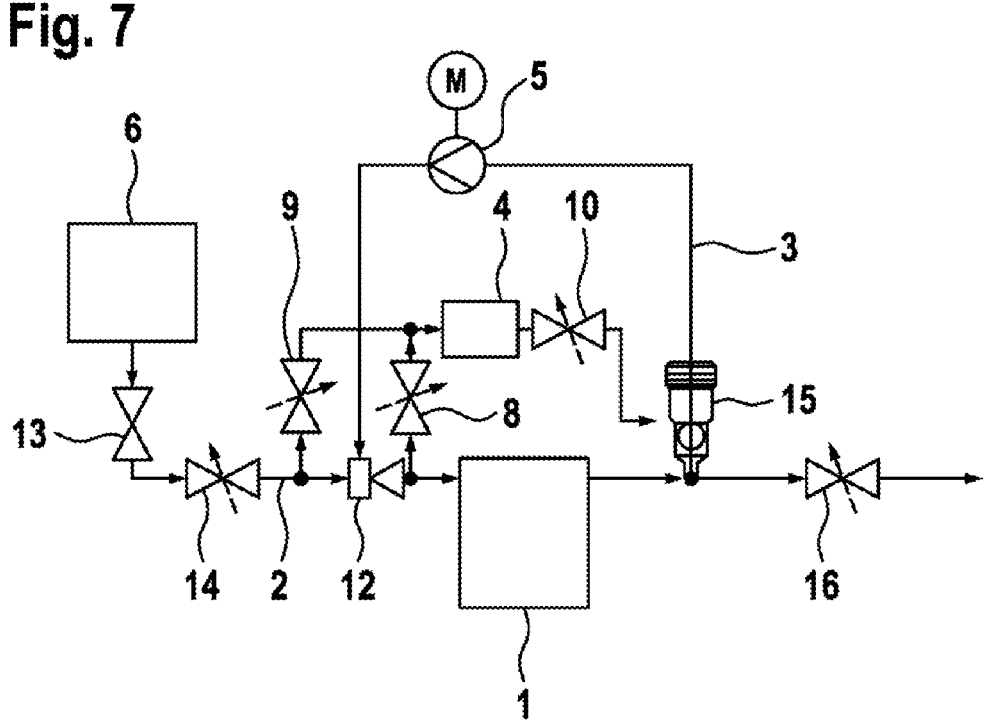
FIG. 7 shows a schematic illustration of an anode region of a seventh preferred embodiment of a fuel cell system according to the invention.

A further variant is illustrated in FIG. 7. Here, the drying device 4 is connected to the supply path 2 via two normally open valves 8, 9. Thus, similarly to the embodiment illustrated in FIG. 5, fresh or dry anode gas can be supplied to the drying device 4 from the tank 6 in order to accelerate desorption.

The invention claimed is:

1. A method for operating a fuel cell system in which an anode gas is supplied to an anode (1) of a fuel cell via a supply path (2), and the anode gas from the anode (1) is recirculated via a recirculation path (3) connected to the anode (1), wherein hydrogen is used as the anode gas, wherein, during a starting of the fuel cell system, the anode gas is supplied from the supply path (2) to a drying device (4) via at least one normally open valve (8, 9, 10), and water is extracted from the anode gas using the drying device (4), wherein an inlet of the recirculation path (3) and an outlet of the recirculation path (3) each extend from the supply path (2) such that the recirculation path (3) is upstream of the anode (1).

2. The method as claimed in claim 1, wherein, during an operating shutdown of the fuel cell system, the anode gas is supplied to the drying device (4) via at least one normally open valve (8, 9, 10), and water is extracted from the anode gas using the drying device (4), wherein an operation of a blower (5) arranged in the recirculation path (3) is maintained.

3. The method as claimed in claim 1, wherein water is removed from the drying device (4) by desorption during the operation of the fuel cell system.

4. The method as claimed in claim 3, wherein, to promote desorption during the operation of the fuel cell system, fresh anode gas is supplied to the drying device (4) from a tank (6) and/or the drying device (4) is heated by a heating device (7).

5. A fuel cell system comprising at least one fuel cell having an anode, which is connected on an inlet side to a supply path (2) for supplying an anode gas and on an outlet side to a recirculation path (3) for recirculating the anode gas, wherein a drying device (4) is connected to the supply path (2) via at least one normally open valve (8, 9, 10), wherein the drying device is arranged in parallel with the anode (1) in a path that extends from the supply path (2) to the recirculation path (3), bypassing the anode (1).

6. The fuel cell system as claimed in claim 5, wherein the drying device (4) is connected to the supply path (2) via at least one normally open valve (8, 9) and can be connected to the recirculation path (3) via a check valve (11) opening in a direction of the recirculation path (3).

7. The fuel cell system as claimed in claim 5, wherein an ejector pump (12) is arranged in the supply path (2) and/or a blower (5) is arranged in the recirculation path (3) to promote the recirculation of the anode gas.

8. The fuel cell system as claimed in claim 5, wherein the drying device (4) has a heating device (7).

9. The fuel cell system as claimed in claim 5, wherein the drying device (4) comprises a container which is filled with zeolite and is designed to be permeable to the anode gas at least in some region or regions.

10. The method as claimed in claim 1, wherein the fuel cell system is a PEM fuel cell system.

11. The method as claimed in claim 1, wherein the drying device (4) is an adsorber.

12. The fuel cell system as claimed in claim 5, wherein the fuel cell system is a PEM fuel cell system.

13. The fuel cell system as claimed in claim 5, wherein the drying device (4) is an adsorber.

14. The fuel cell system as claimed in claim 9, wherein the zeolite in the container is configured as a bed.

15. The method as claimed in claim 1, wherein the anode gas is supplied to the supply path (2) via a tank (6) and is supplied from the supply path (2) to the drying device (4) at a location between the tank (6) and the anode (1).

16. The method as claimed in claim 15, wherein the recirculation path (3) terminates at the supply path (2) at a location between the tank (6) and the anode (1).

17. The fuel cell system as claimed in claim 5, wherein the anode gas is supplied to the supply path (2) via a tank (6) and is supplied from the supply path (2) to the drying device (4) at a location between the tank (6) and the anode (1).

18. The fuel cell system as claimed in claim 17, wherein the recirculation path (3) terminates at the supply path (2) at a location between the tank (6) and the anode (1).

\* \* \* \* \*